United States Patent
Assénat et al.

(10) Patent No.: US 9,598,128 B2
(45) Date of Patent: Mar. 21, 2017

(54) OBJECT MANAGEMENT SYSTEM WITH LOCKING MECHANISM

(71) Applicant: 8D Technologies Inc., Montreal (CA)

(72) Inventors: Raphaël Assénat, Quebec (CA); Jean-Sébastien Bettez, Hudson (CA)

(73) Assignee: 8D Technologies Inc., Montreal (CA)

( * ) Notice: Subject to any disclaimer, the term of this patent is extended or adjusted under 35 U.S.C. 154(b) by 379 days.

(21) Appl. No.: 14/093,374

(22) Filed: Nov. 29, 2013

(65) Prior Publication Data
US 2015/0152668 A1    Jun. 4, 2015

(51) Int. Cl.
*B62H 3/02* (2006.01)
*B62H 3/00* (2006.01)

(52) U.S. Cl.
CPC ......... *B62H 3/02* (2013.01); *B62H 2003/005* (2013.01); *Y10T 70/70* (2015.04); *Y10T 70/7062* (2015.04); *Y10T 70/7441* (2015.04)

(58) Field of Classification Search
CPC ... B62H 3/00; B62H 1/00; B62H 3/10; B62H 3/02; B62H 5/005; B62H 2003/005; B62H 5/20; B62H 2700/005; B62H 5/02; B62H 5/04; B62H 5/06; B62H 2700/00; E05B 71/00; E05B 39/005; E05B 73/00; Y10T 70/5872; Y10T 70/5881; Y10T 70/70; Y10T 70/7062; Y10T 70/7441; B60R 9/10; B60H 5/003; B60H 5/001
USPC ........................ 70/233–235; 211/5
See application file for complete search history.

(56) References Cited

U.S. PATENT DOCUMENTS

| | | | | |
|---|---|---|---|---|
| 640,775 A | * | 1/1900 | Kerekes | E05B 67/36 70/32 |
| 1,499,155 A | * | 6/1924 | Christianson | B61D 7/16 105/310.1 |
| 2,145,173 A | * | 1/1939 | Hankins | B61D 7/16 105/282.1 |

(Continued)

FOREIGN PATENT DOCUMENTS

| CA | 2742511 A1 | 5/2008 |
|---|---|---|
| CA | 2699712 C | 10/2009 |
| CN | 202731467 U | 2/2013 |

OTHER PUBLICATIONS

PCT Written Opinion and International Search Report of the International Searching Authority for International Application No. PCT/CA2014/000856, dated Mar. 13, 2015, 10 pages.

*Primary Examiner* — Suzanne Barrett
(74) *Attorney, Agent, or Firm* — Wolf, Greenfield & Sacks, P.C.

(57) ABSTRACT

An object management system and locking mechanism and method. The system comprises a plurality of docking stations and a terminal connected to the docking stations by a network. At least one of the docking stations includes the locking mechanism for locking a locking member secured to an object. The locking mechanism includes: a locking receptacle configured to receive the locking member, as well as a locking shaft with a locked position and an unlocked position. The locking shaft is configured to secure the locking member when the locking shaft is in the locked position while the locking receptacle is receiving the locking member. The locking shaft rotates to switch between the locked position and the unlocked position. The locking mechanism can provide a secure lock on an object, preventing reversal of the locking mechanism and theft of the object.

20 Claims, 16 Drawing Sheets

(56) References Cited

U.S. PATENT DOCUMENTS

| | | | | |
|---|---|---|---|---|
| 3,521,511 A * | 7/1970 | Beckers | ............... | B23Q 3/12 279/901 |
| 3,709,152 A * | 1/1973 | Gutridge | ............... | B61D 7/20 105/253 |
| 3,802,232 A * | 4/1974 | Mattson | ............... | B62H 3/10 70/234 |
| 3,944,079 A * | 3/1976 | Boslough | ............... | B62H 3/10 211/22 |
| 4,269,049 A * | 5/1981 | Henderson | ............... | E05B 71/00 211/20 |
| 4,830,167 A * | 5/1989 | Lassche | ............... | B62H 3/00 194/247 |
| 5,323,915 A * | 6/1994 | Fortune, Sr. | ............... | B62H 3/00 211/22 |
| 5,553,715 A * | 9/1996 | Brotz | ............... | B62H 3/00 211/17 |
| 5,841,351 A * | 11/1998 | Rey | ............... | B62H 5/00 307/10.5 |
| 6,338,261 B1 * | 1/2002 | Liu | ............... | E05B 67/36 70/14 |
| 6,384,717 B1 * | 5/2002 | DeVolpi | ............... | B62H 3/02 194/205 |
| 6,962,066 B2 * | 11/2005 | Larsen | ............... | E05B 83/10 292/207 |
| 7,210,316 B1 * | 5/2007 | Falconer | ............... | E05B 13/002 292/218 |
| 7,434,674 B1 * | 10/2008 | Bain | ............... | G07F 7/0627 194/205 |
| 7,748,511 B1 * | 7/2010 | Maher | ............... | G07F 7/0663 194/205 |
| 7,770,422 B1 * | 8/2010 | Sierra | ............... | E05B 67/36 70/2 |
| 7,823,937 B2 * | 11/2010 | Vitry | ............... | E05B 83/30 292/336.3 |
| 7,836,736 B2 * | 11/2010 | Humphris | ............... | E05B 17/2038 292/281 |
| 8,061,499 B2 * | 11/2011 | Khairallah | ............... | B62H 3/02 194/211 |
| 8,272,491 B2 * | 9/2012 | Khairallah | ............... | B62H 3/02 194/211 |
| 8,517,162 B2 * | 8/2013 | Khairallah | ............... | B62H 3/02 194/211 |
| 8,547,228 B2 * | 10/2013 | Brodzik | ............... | E05B 73/0017 340/568.1 |
| 8,678,205 B2 * | 3/2014 | Mercat | ............... | B62H 3/02 211/5 |
| 2007/0220933 A1 * | 9/2007 | Gagosz | ............... | B62H 3/00 70/233 |
| 2008/0018440 A1 * | 1/2008 | Aulbers | ............... | B62H 5/00 340/432 |
| 2008/0042450 A1 * | 2/2008 | Jianping | ............... | E05B 1/0038 292/216 |
| 2008/0042452 A1 * | 2/2008 | Moon | ............... | E05B 15/102 292/337 |
| 2008/0297108 A1 * | 12/2008 | Le Gars | ............... | H01M 10/441 320/109 |
| 2009/0240575 A1 * | 9/2009 | Bettez | ............... | B62H 3/00 705/13 |
| 2010/0228405 A1 * | 9/2010 | Morgal | ............... | B62H 3/02 701/2 |
| 2011/0037240 A1 * | 2/2011 | Kritzer | ............... | E05B 47/0603 280/293 |
| 2015/0167351 A1 * | 6/2015 | Singh | ............... | E06B 1/52 49/504 |

\* cited by examiner

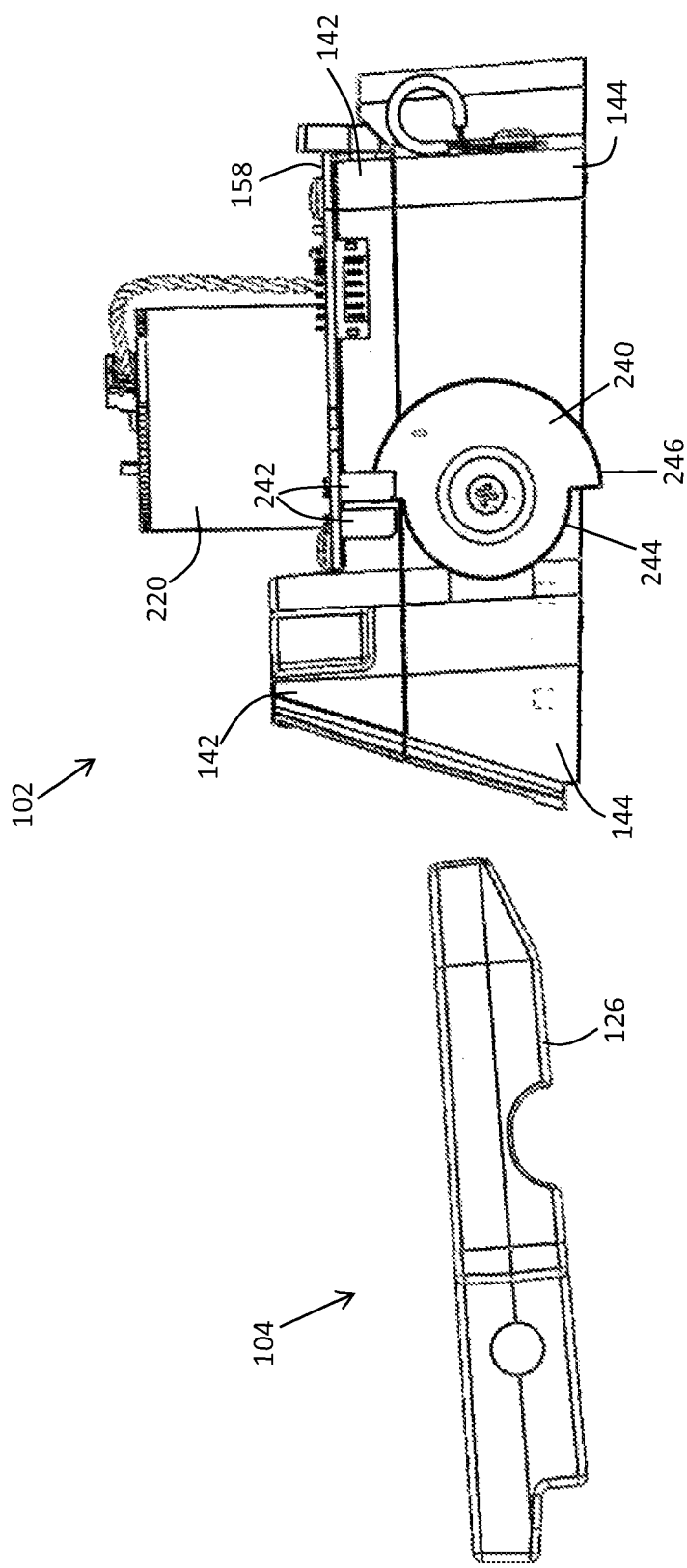

SECTION D-D

OBJECT MANAGEMENT SYSTEM WITH LOCKING MECHANISM

BACKGROUND

Object management systems include several rental/docking stations located in different parts of a city that allow a user to store, rent, pick up, and return an object (hereinafter referring specifically to a cycle). To prevent theft, the docking stations include a locking mechanism to lock the cycle to a dock, post, or other fixed structure between rental periods. When a user wishes to rent a cycle from the docking station, the user is required to insert some form of payment or identification to validate the rental and unlock the cycle. When the rental is complete, the user returns the cycle to the docking station where the cycle is again locked via the locking mechanism.

SUMMARY

One problem with current locking mechanisms is that they are not theft-proof. Locking mechanisms that have moveable parts may break, malfunction, or be manipulated to unlock without permission. Often, current locking mechanisms include plastic components which yield quickly or easily to strong forces, releasing the cycle from the docking station.

Another issue with current locking mechanisms is ensuring that the cycle is properly locked when the user returns it to the docking station. When a user returns a cycle, the lock may malfunction, but some users may reasonably believe that the cycle is properly locked and leave the cycle unsecured. On the other hand, some locking mechanisms require force to insert or remove a cycle from a docking station. Many users may not be able to apply this force. Locking mechanisms may also be jammed or damaged in the event that a user tries to pull the cycle out of the docking station during the locking or unlocking movement. This could damage the locking mechanism and/or the cycle.

Aspects of the current invention seek to solve the problems of the prior art by providing a locking mechanism for a cycle management system that is simple, reliable, and theft-proof. The locking mechanism may include a locking receptacle for receiving and securing a locking member. Such a locking mechanism would be beneficial to use in cycle management systems to lock a cycle to a docking station between rentals. The locking member may be secured to a bicycle or other cycle and positioned such that it may be inserted into a locking receptacle of the docking station.

Some embodiments may include a locking mechanism having a locking member, a locking receptacle for receiving the locking member, and a locking shaft that rotates between a locked and an unlocked position. Preferably, the locking shaft is a cylindrical shaft that axially rotates between the locked and unlocked positions. Since the locking shaft may not slide, protrude, or displace in any linear direction, the locking mechanism avoids the problem of theft by wiggling a cycle and displacing a moveable member out of a locked position. Such a locking mechanism is ideal for cycle management systems.

In some embodiments, the locking mechanism may include an irreversible drive such as a worm drive driven by a motor to rotate the locking shaft.

According to some embodiments, the locking mechanism may include a cycle present switch to detect when the locking member is in the locking position. In the event a cycle is pulled away from the locking receptacle during the locking movement of the locking shaft, the switch will detect the motion and reverse the rotation of the shaft to allow the cycle to be pulled away, preventing damage to the locking mechanism.

In some embodiments, the locking mechanism may include a sensing wheel connected to the locking shaft and optical wheel sensors to detect the position of the locking shaft. The optical wheel sensors may detect the shaft's position by detecting when a smaller wheel diameter of the sensing wheel aligns with one of the optical wheel sensors and a larger wheel diameter of the sensing wheel aligns with another of the optical wheel sensors.

In some embodiments, the locking member may include an RFID tag.

Aspects of the invention include a locking mechanism for locking a locking member secured to an object, the locking mechanism comprising a locking receptacle configured to receive the locking member, and a locking shaft positioned in the locking receptacle, the locking shaft having a locked position and an unlocked position, wherein the locking shaft is configured to secure the locking member when the locking shaft is in the locked position while the locking receptacle is receiving the locking member, and the locking shaft is configured to rotate to switch between the locked position and the unlocked position.

Further aspects of the invention include a method for locking an object, the method comprising securing a locking member to a locking receptacle when a locking shaft is in a locked position while the locking receptacle is receiving the locking member, and switching the locking shaft between the locked position and an unlocked position by rotating the locking shaft.

Other aspects of the invention include an object management system comprising a plurality of docking stations, and a terminal connected to the plurality of docking stations by a network, wherein at least one of the plurality of docking stations may include a key reader configured to read a key, and a locking mechanism for locking a locking member secured to an object, the locking mechanism including a locking receptacle configured to receive the locking member, and a locking shaft positioned in the locking receptacle, the locking shaft having a locked position and an unlocked position, wherein the locking shaft is configured to secure the locking member when the locking shaft is in the locked position while the locking receptacle is receiving the locking member, and the locking shaft is configured to rotate to switch between the locked position and the unlocked position.

BRIEF DESCRIPTION OF THE DRAWINGS

The accompanying drawings are not necessarily intended to be drawn to scale. In the drawings, each identical or nearly identical component that is illustrated in various figures is represented by a like numeral. For purposes of clarity, not every component may be labeled in every drawing. In the drawings:

FIG. 4B is a side elevation view of the locking member and the locking receptacle of FIG. 2;

DETAILED DESCRIPTION

Figure 1:
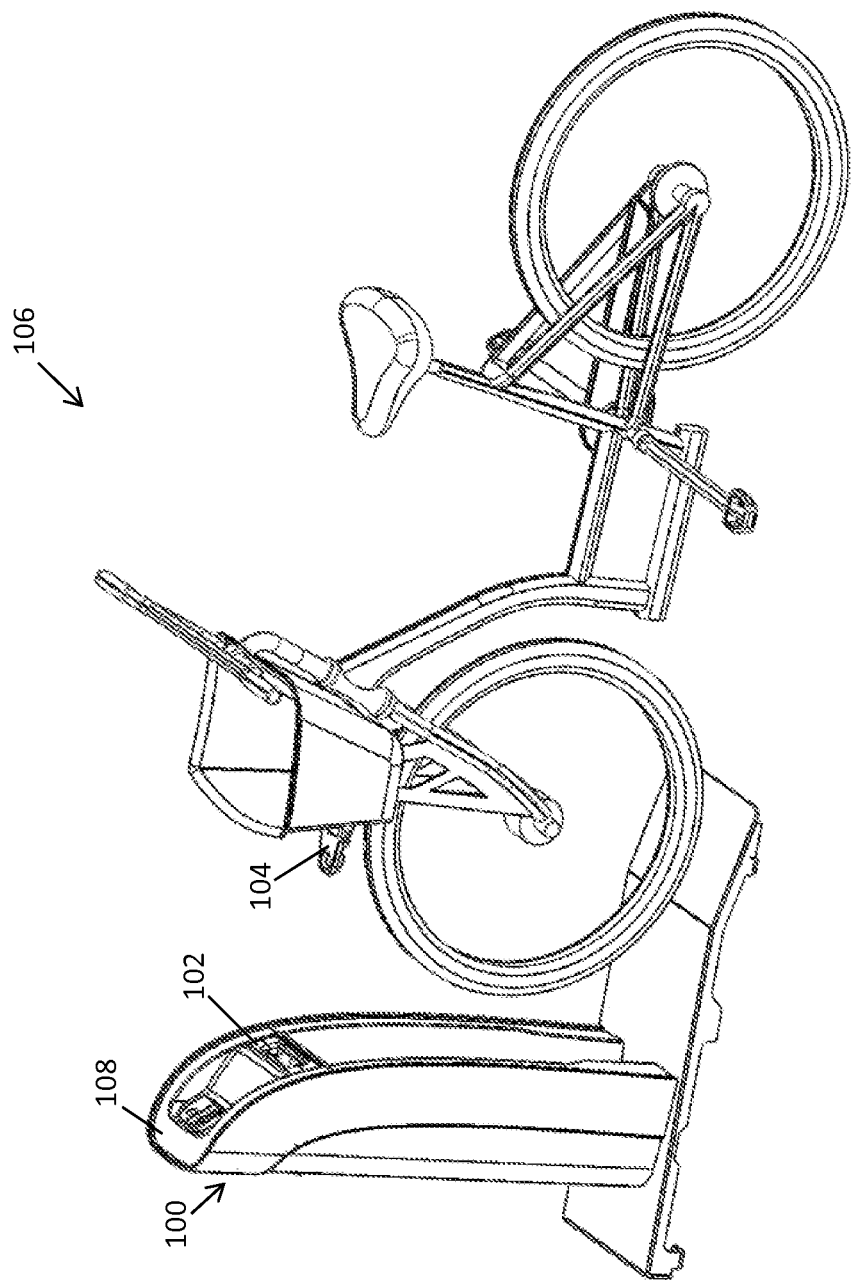
FIG. 1 is a perspective view of a cycle and a docking station according to an embodiment.
Figure 2:
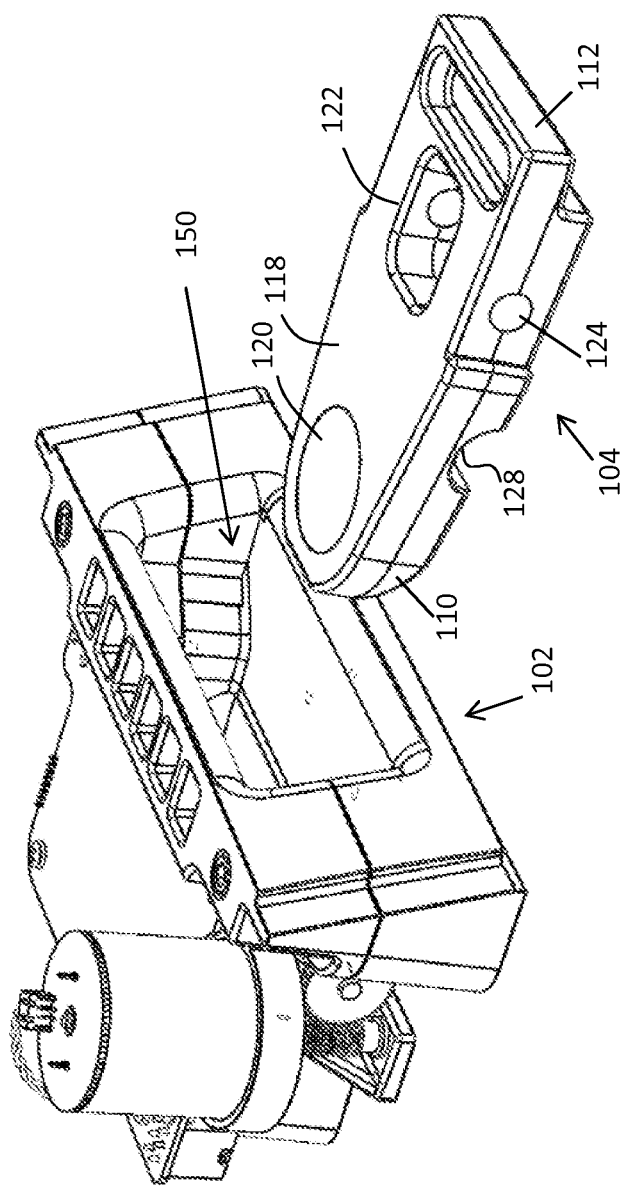
FIG. 2 is a perspective view of a locking receptacle and a locking member according to some embodiments.
Figure 3A:
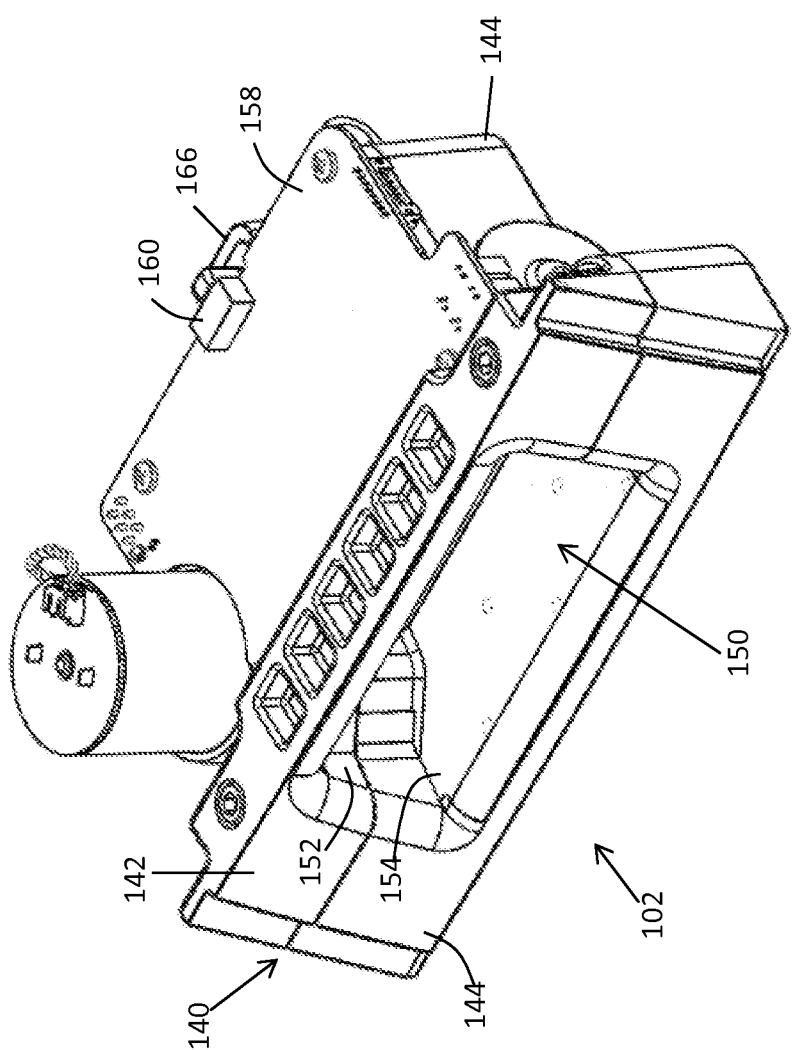
FIGS. 3A and 3B are perspective views of the locking receptacle of FIG. 2.
Figure 3B:
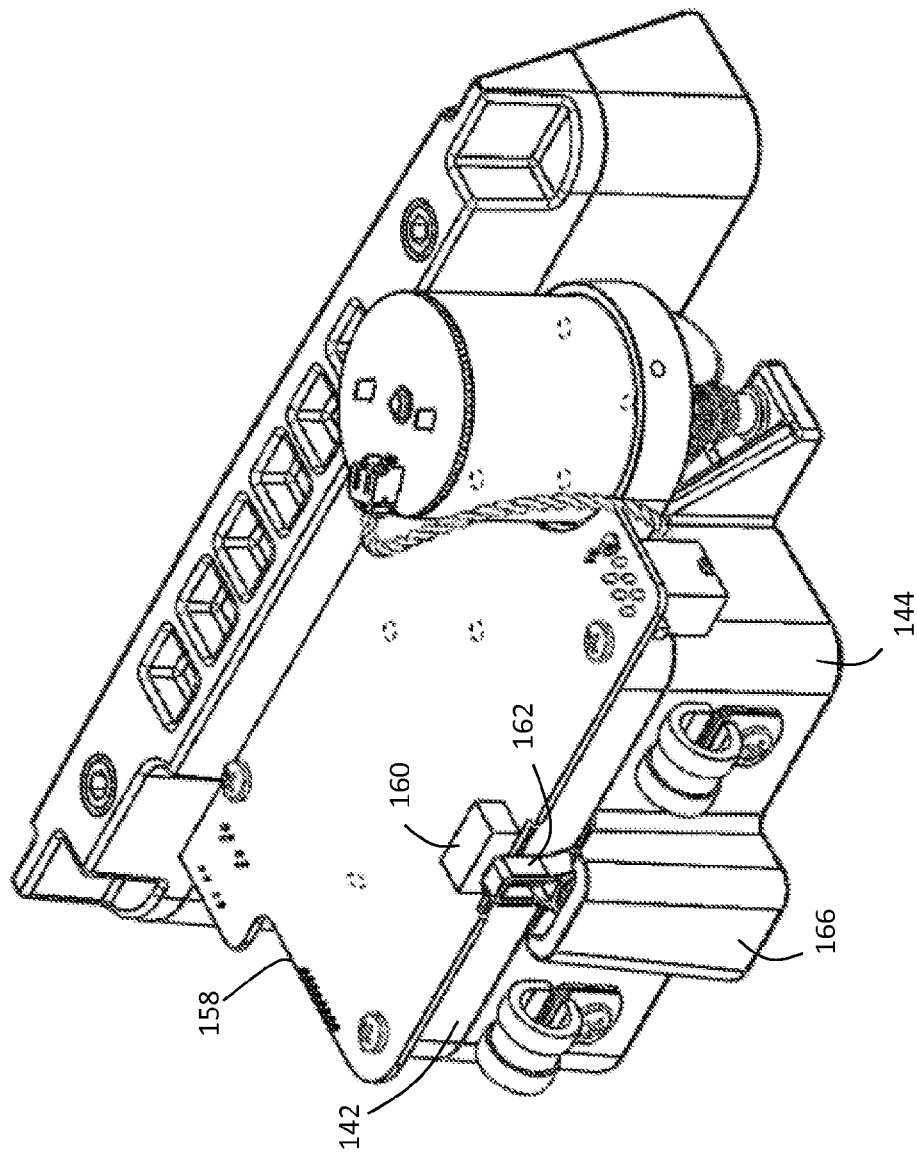

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," "having," "containing," or "involving," and variations thereof herein, is meant to encompass the items listed thereafter and equivalents thereof as well as additional items.

FIG. 1 illustrates the locking mechanism of the cycle management system according to some embodiments. A cycle 106 may include a locking member 104 for engaging with a cycle docking station 100. The cycle docking station 100 may include a locking receptacle 102 for receiving and locking the locking member 104 to the cycle docking station 100.

FIGS. 2-12C illustrate some embodiments in which the locking receptacle 102 may include a recess 150 for inserting the locking member 104. The locking member 104 may include an insert end 110 to be inserted into the recess 150 of locking receptacle 102. The insert end 110 may be rounded. The locking member 104 may also have an attachment end 112. The insert end 110 may help guide the locking member 104 into the recess 150 of the locking receptacle 102. Alternatively, the insert end 110 may be cube-shaped, pyramid-shaped, or any other shape.

The locking member 104 may be formed as an integral part of the cycle 106 or formed separately and attached to the cycle 106 via the attachment end 112. The attachment end 112 may include components for securing the locking member 104 to the cycle 106 via screws or other attachment means. These components may include a torsion spring hole 122 for a torsion spring (not shown) and/or a locking member attachment shaft hole 124 for a locking member attachment shaft (not shown).

The locking receptacle 102 may include a housing 140 having an upper housing 142 and a lower housing 144 with upper and lower inner walls 152, 154 that define the recess 150 for receiving the locking member 104. The upper and lower housings 142, 144 may be formed integrally or as separate pieces that are joined together. The upper and lower inner walls 152, 154 may be rounded or slanted to guide the locking member 104 toward an elongated opening 200 (shown in FIG. 8). The elongated opening 200 may be shaped to accommodate the locking member 104, mating snugly with the top 118 and the bottom 126 of the locking member 104. The insert end 110 of the locking member 104 may be inserted to make contact with the end of the elongated opening 200, which may have a rounded shape to match the insert end 110. The locking receptacle 102 may include a bike/cycle dock controller (BDC) 158 and a radio frequency identification (RFID) antenna (not shown), which may be part of or separate from the BDC 158. The BDC 158 may read an RFID tag 204 (shown in FIG. 8) in the locking member 104 using the RFID antenna (hereinafter, the RFID antenna will typically be said to "read" the RFID tag 204) to identify the cycle 106 or other moveable object that is being returned to the docking station 100. The RFID tag 204 and the RFID antenna may be located anywhere in the locking member 104 and the locking receptacle 102, respectively, that allows the RFID antenna to read the RFID tag 204.

Figure 8:
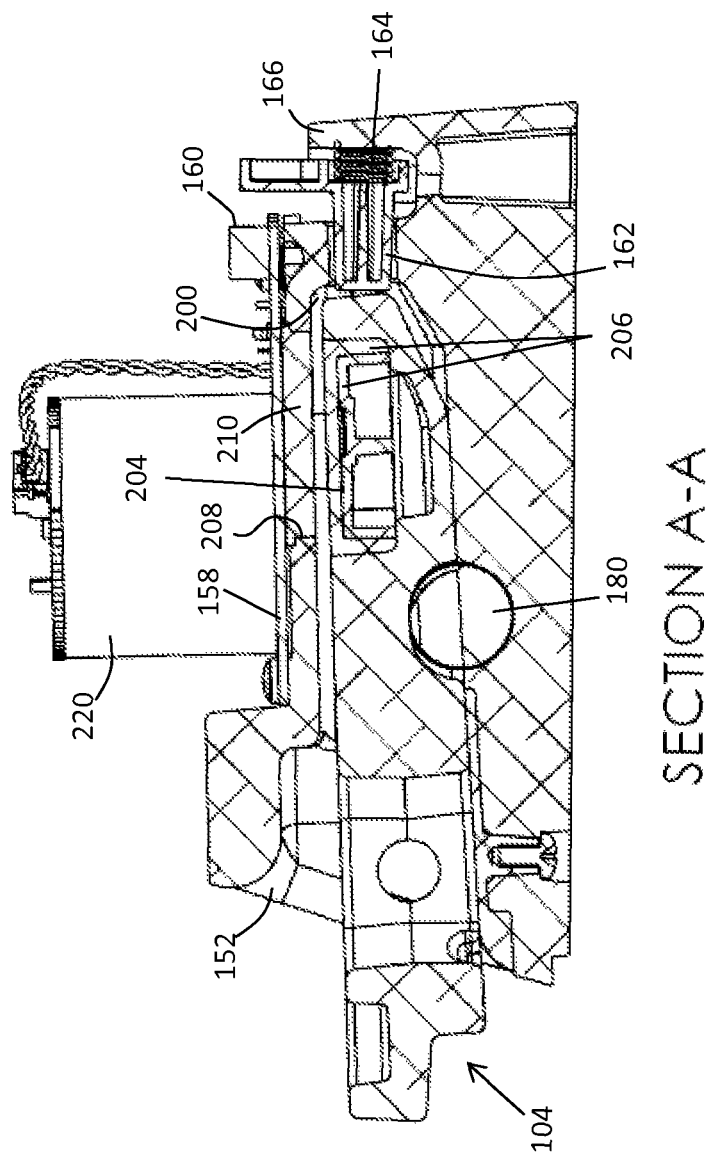
FIG. 8 is a cross-sectional view taken along line AA of FIG. 7.

In some embodiments, the BDC 158 may be positioned above the upper housing 142 and the RFID tag 204 may be located in an RFID tag compartment 120 in the top 118 of the locking member 104. The RFID tag 204 may be located within a RFID tag enclosure 206 inside the RFID tag compartment 120 as shown in FIG. 8. In embodiments where the locking receptacle 102 is made of metal or other materials that block or inhibit radio waves, there may be an opening 208 (shown in FIG. 8) in the upper housing 142 centered on the RFID antenna. The opening 208 may be filled with plastic 210 or any other material that would allow the RFID antenna to read an RFID tag 204 in the RFID tag compartment 120 of the locking member 104.

The locking system functions by inserting the locking member 104 into the elongated opening 200 of the locking receptacle 102. When the locking member 104 is in the proper locking position, a locking shaft 180 (shown in FIGS. 8-9 and 12A-12C) in the locking receptacle 102 engages the locking member 104 to secure the locking member 104 in a locked state.

According to some embodiments, the locking member 104, when in the proper locking position, triggers a cycle present switch 160 (shown in FIGS. 3A, 3B, 6, and 8-11) that causes a locking shaft 180 in the locking receptacle 102 to engage the locking member 104. The cycle present switch 160 may be a mechanical switch that directly triggers the locking shaft 180, or the cycle present switch 160 may trigger the locking shaft 180 indirectly by alerting the BDC 158 to the potential presence of a cycle 106. The BDC 158 may then attempt to verify the presence of the cycle 106, and if the presence is verified, the BDC 158 may trigger the locking shaft. Alternatively, the cycle present switch 160 may be optical, magnetic, or any other type of switch. For example, the cycle present switch 160 could be a reed switch or a hall effect sensor.

According to some embodiments illustrated in FIG. 8, the proper locking position may be where the insert end 110 of the locking member 104 contacts the end of the elongated opening 200. The cycle present switch 160 may be located at the end of the elongated opening 200 such that the locking member 104 will trigger the cycle present switch 160 when the locking member 104 is inserted into the locking receptacle 102. Alternatively, the cycle present switch 160 may be triggered indirectly by the locking member 104 through one or more objects. In some embodiments, a plunger 162 may be positioned at the end of the elongated opening 200. When the locking member 104 is inserted into the elongated opening 200, the locking member 104 may contact and displace the plunger 162. The plunger 162 may trigger the cycle present switch 160 when the plunger 162 is displaced a determined distance. The plunger 162 also may include or be connected to a switch trigger (not shown) that triggers the cycle present switch 160 when the plunger 162 is displaced. A spring 164 may also be provided. When no locking member 104 is present in the locking receptacle 102, the plunger 162 may return to its default (non-triggering) position by the means of the spring 164. A stopper 166 may also be provided to prohibit the plunger 162 from displacing too far. Providing a plunger 162 to indirectly trigger the cycle present switch 160 may protect the switch. For example, if a cycle 106 is inserted at high velocity (e.g., approximately ten miles per hour or greater) or if a foreign object (e.g., hammer, screwdriver, etc.) is inserted into the locking receptacle 102 such as in a theft attempt, the plunger 162, rather than the cycle present switch 160, may be subjected to correspondingly strong forces. Further, the plunger 162 will hit the stopper 166 to inhibit its displacement, preventing undue forces on the cycle present switch 160.

The cycle present switch 160 may be mounted on the BDC 158, which has the advantage of reduced assembly complexity, higher reliability due to less connectors and less cables, and reduced costs. Alternatively, the cycle present switch 160 may be separate from the BDC 158 and connected to the BDC 158 using any suitable connectors.

The locking shaft 180 has at least two positions: locked and unlocked. According to some embodiments, when the locking member 104 is in the proper locking position, the locking shaft 180 may be triggered (e.g., by actuating of the cycle present switch 160) to maintain the locked position. The locking shaft 180 may maintain the locked position until a user completes a rental transaction to rent the cycle 106 or other moveable object.

In some embodiments, the locking shaft 180 may be positioned in the locking receptacle 102 such that when it is in the unlocked position, the locking member 104 may be freely inserted and removed from locking receptacle 102 (i.e., there are no obstructions in the recess 150 or the elongated opening 200). When the locking shaft 180 is in the locked position, at least a part of the locking shaft 180 may protrude into the recess 150 or the elongated opening 200 to engage at least a portion of the locking member 104 to prevent removal of the locking member 104. The locking shaft 180 may switch from the locked position to the unlocked position, or vice versa, by any motion (e.g., rotation, pivoting, actuation, articulation, elevation, etc.).

In some embodiments, the locking shaft 180 is positioned in the locking receptacle 102 such that its outside surface aligns with an inner wall of the recess 150. The locking shaft 180 may include a lock side 182 and an unlock side 184, the unlock side 184 having a cutout 186, which extends into the locking shaft 180 to a distance of half of the diameter (or the radius) of the locking shaft 180 and along a length of the locking shaft 180. When the locking member 104 is not in the recess 150, the locking shaft 180 is in an unlocked position—the cutout 186 facing the recess 150—providing a clear passageway to allow the locking member 104 to be inserted. Once the locking member 104 is properly inserted into the recess 150, the locking shaft 180 may rotate to a locked position—the cutout 186 facing away from the recess 150—such that the lock side 182 of the locking shaft 180 engages a portion of the locking member 104 to secure the locking member 104 in place.

Figure 5:
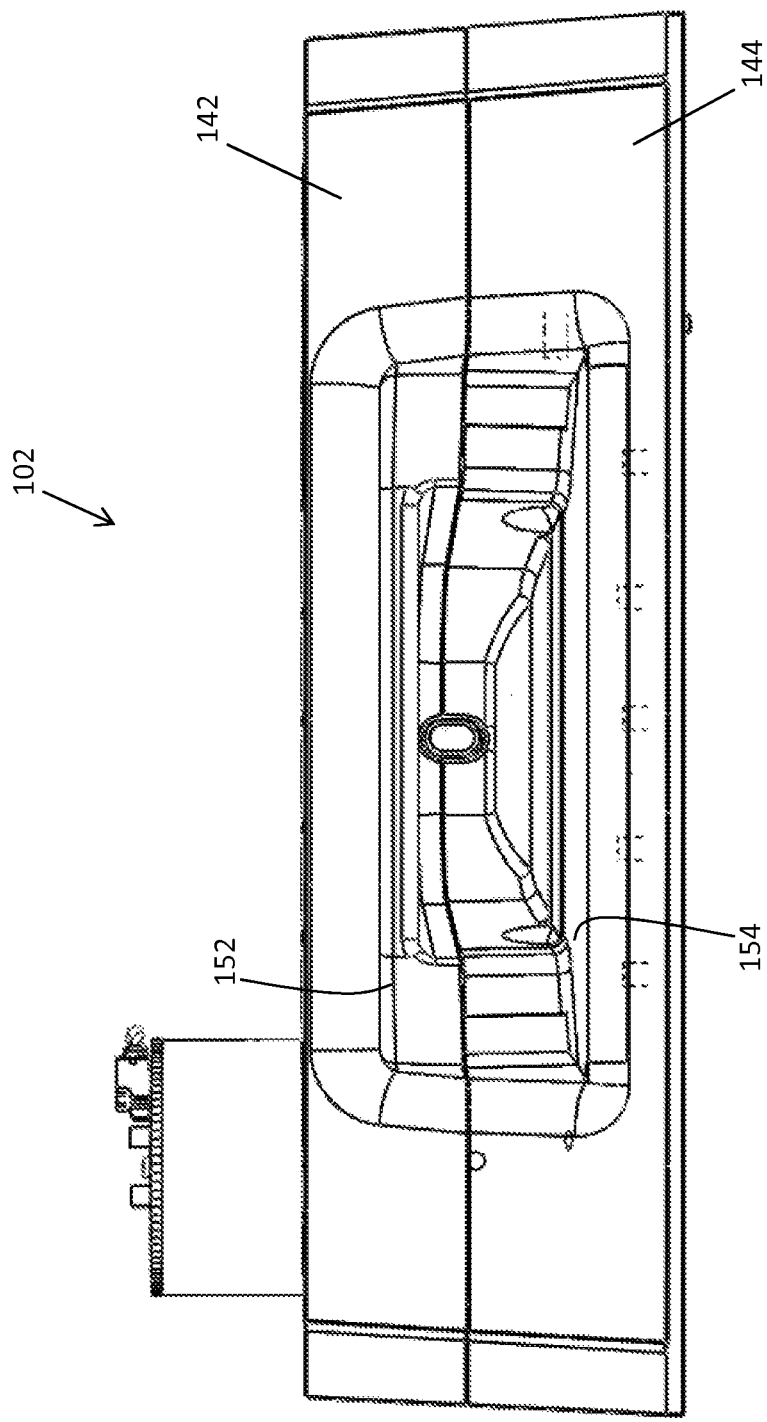
FIG. 5 is a front elevation view of the locking receptacle of FIG. 2.
Figure 6:
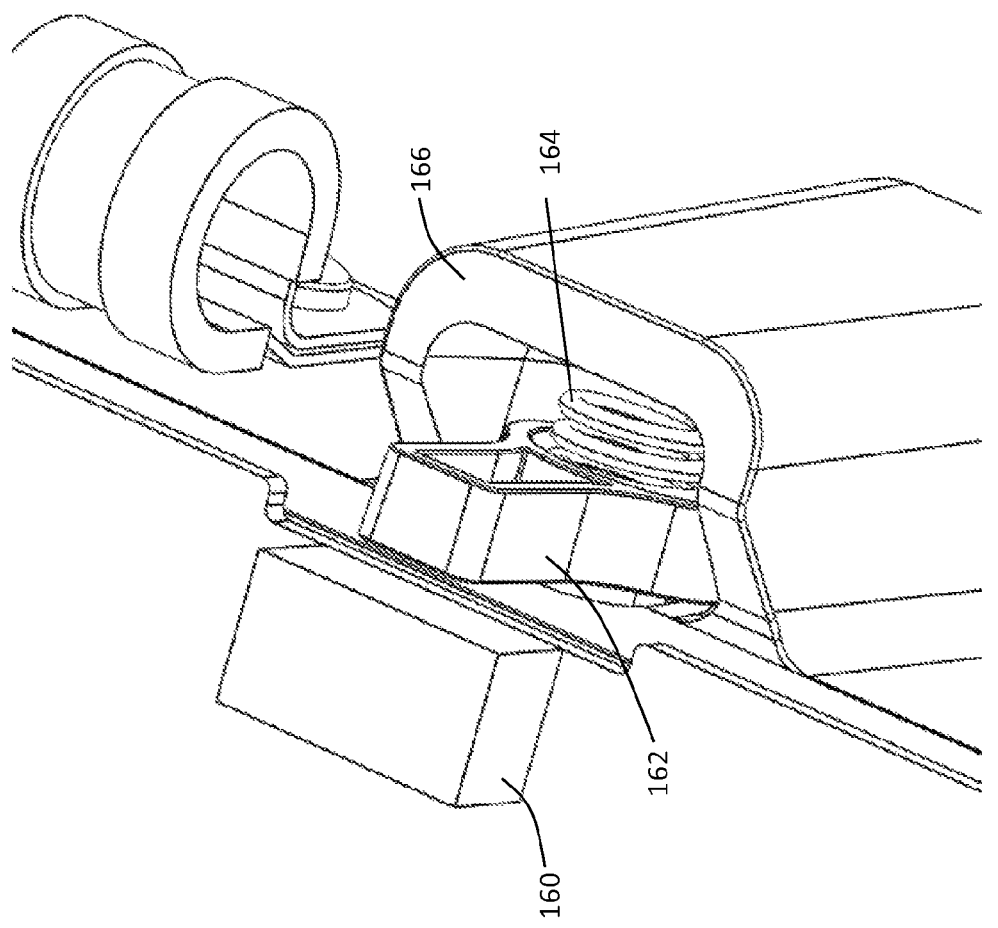
FIG. 6 is a perspective view of a spring, a stopper, a cycle present switch, and a plunger on the locking receptacle of FIG. 2.
Figure 7:
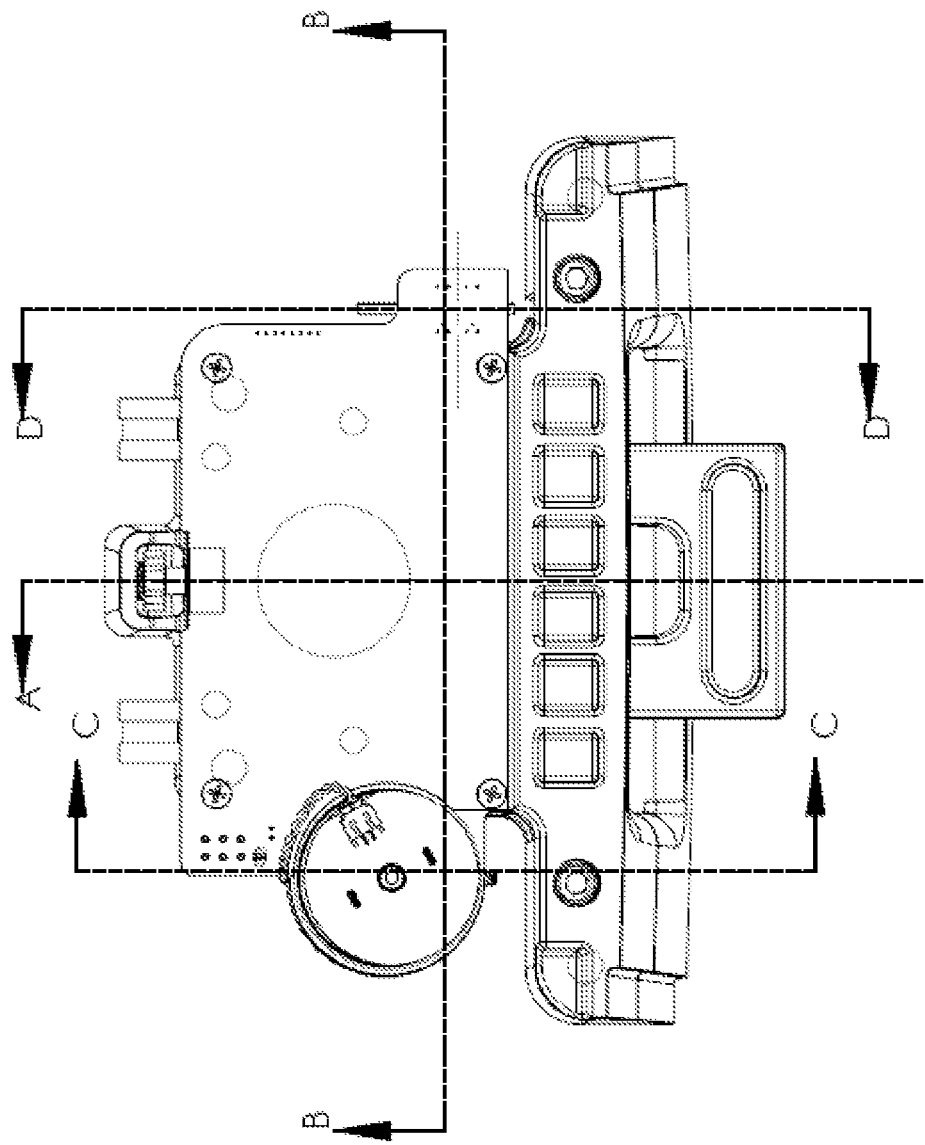
FIG. 7 is a top plan view of the locking receptacle and the locking member of FIG. 2 in a proper locking position.
Figure 9:
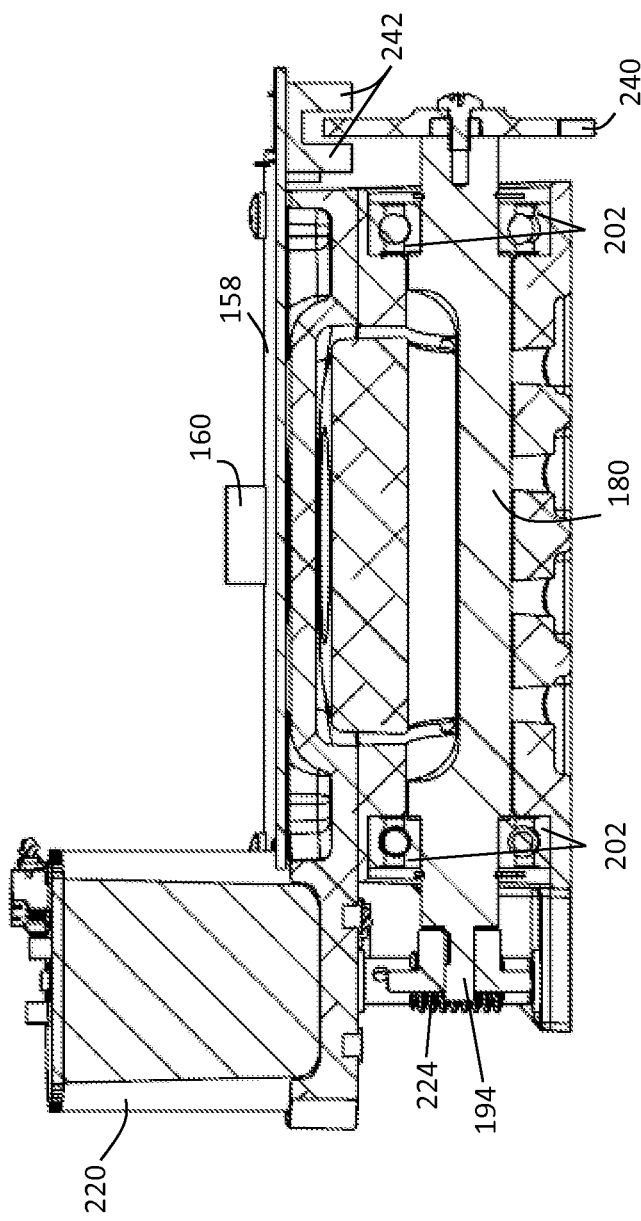
FIG. 9 is a cross-sectional view taken along line BB of FIG. 7.
Figure 10:
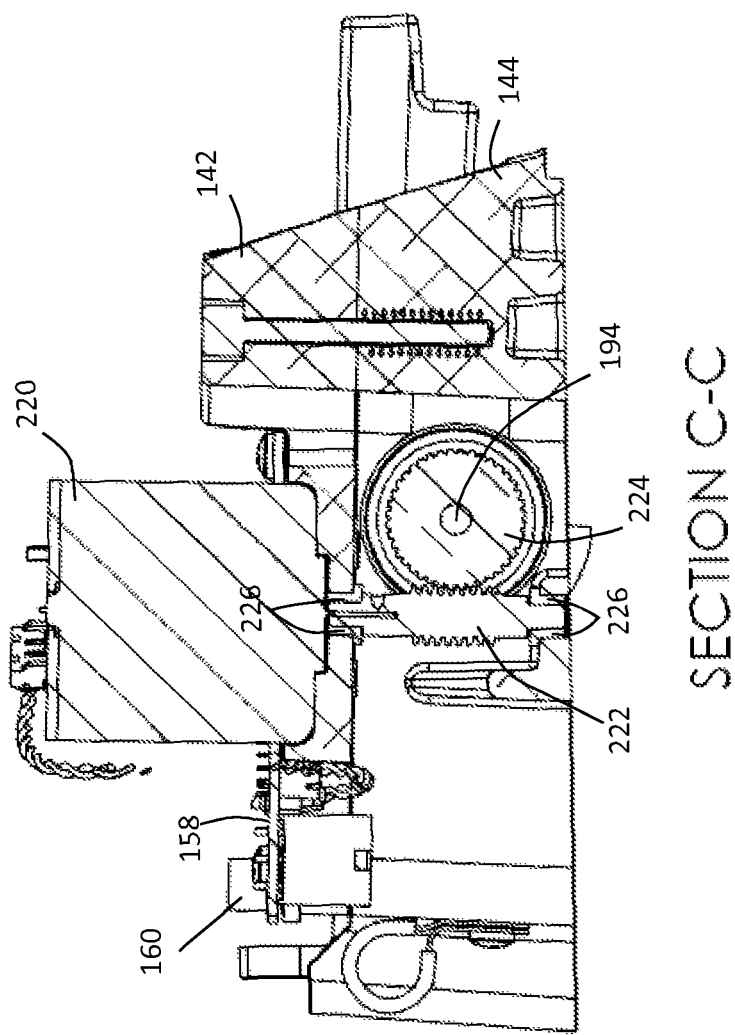
FIG. 10 is a cross-sectional view taken along line CC of FIG. 7.

According to some embodiments, as shown in FIGS. 5 and 8-9, the locking shaft 180 may be positioned within the lower housing 144 perpendicular to the direction of insertion of the locking member 104 and parallel to a channel 128 of the locking member 104. The locking shaft 180 may be supported on support ends 188, 190 by locking shaft support bearings 202. The locking shaft support bearings 202 allow axial rotation of the locking shaft 180 while inhibiting other movement of the locking shaft 180. The locking shaft 180 is positioned to align with the channel 128 of the locking member 104 when the locking member 104 is in the proper locking position. The cutout 186 may be machined to have an angle that closely matches the converging sides of the locking member 104. In the unlocked position, the locking shaft 180 may be rotated such that the cutout 186 faces the elongated opening 200, allowing the locking member 104 to be inserted or removed from the elongated opening 200. In the locked position, the locking shaft 180 may be rotated such that the non-machined lock side 182 protrudes into the elongated opening 200, engaging the channel 128. The channel 128 may have a larger radius than the locking shaft 180. These embodiments provide important advantages. For example, if the cutout 186 extends to half of the diameter of the locking shaft 180, a forceful attempt to remove a locked cycle 106 will make the contact point between the locking member 104 and the locking shaft 180 near the rotation axis of the locking shaft 180. This makes most of the force linear and directed towards the outside, minimizing rotational force that could reversibly rotate the locking shaft 180. Minimizing the rotational force is advantageous because it prevents wear and tear on any gear teeth or other vulnerable components the system may have.

Moreover, the channel 128 having a larger radius than the locking shaft 180 may mitigate potential tolerance problems. For example, if during the locking process (rotation of the locking shaft 180 to locked position) the user tries to pull the cycle 106 or moveable object away, rendering the cycle present switch 160 de-triggered, the locking shaft 180 may instantly reverse the rotation to give way, allowing the locking member 104 to exit the locking receptacle 102 and preventing damage to the system. Another advantage is that once the cycle 106 is unlocked, the user need apply only the force required to move the cycle 106 and overcome friction between the locking member 104 and the locking receptacle 102. Furthermore, this ease of removal of an unlocked cycle 106 may increase the probability that the user would notice when the cycle 106 is not properly locked upon returning the cycle 106, as the cycle 106 may not be held at all firmly in the docking station 100.

In some embodiments, the locking shaft 180 may be rotated between its locked and unlocked positions using a worm drive with a reduction ratio and geometry chosen to achieve self-locking A worm 222 may be driven directly from a motor 220 of the locking receptacle 102. The motor 220 may be a simple (rather than "gearhead") direct current (DC) motor with a high rotations per minute (RPM) and may be controlled by the BDC 158. Such a motor 220 provides important advantages. For example, the motor 220 is easier to control than a stepper motor due to simpler electronics. The motor 220 also may have a lower rotor inertia than a conventional motor, and so it can accelerate and decelerate at steeper rates, allowing acceptable locking times. Moreover, the worm 222 converts the motor's 220 high RPM into higher torque. In addition, the motor 220 does not require much current during normal operation and only requires a higher current if the mechanism is difficult to move (e.g., if the mechanism is stiffened by dirt or wear). On the other hand, a stepper motor tends to require far more current than a simple DC motor, even when less current would have been sufficient to complete movements for locking or unlocking. In battery-powered embodiments, lower current requirements are especially advantageous.

The worm drive also provides an advantage. In alternative embodiments, a Geneva drive mechanism may be used to rotate the locking shaft 180. However, the Geneva drive has a lower reduction ratio than the worm drive. Therefore, the Geneva drive would require additional gearing between the DC motor and the Geneva drive to increase the torque of the locking shaft 180. Nevertheless, any other suitable irreversible drive may be used in place of the worm drive.

The motor 220, fastened to the locking receptacle 102, drives the worm 222 supported at both ends by sleeve bearings 226. The worm 222 matches a worm gear 224 connected to the locking shaft 180 via a worm gear connector 194. The sleeve bearings 226 may protect the motor 220 from excessive forces (e.g., radial or axial) on the worm 222. For example, when the mechanism is not moving freely (e.g., due to friction or foreign objects inserted between the locking member 104 and the locking shaft 180), great axial forces can be generated due to a climbing action of the worm 222 on the worm gear 224.

According to some embodiments, the motor 220, fastened to the locking receptacle 102, drives a motor shaft supported at both ends by radial and thrust bearings (not shown). Alternatively, the radial and thrust bearings may be any other type of bearings. The worm 222 is mounted on the motor shaft and matches the worm gear 224 connected to the locking shaft 180. The radial and thrust bearings may protect the motor 220 from excessive forces on the motor shaft. For example, when the mechanism is not moving freely, great axial forces can be generated due to a climbing action of the worm 222 on the worm gear 224.

According to some embodiments, when the motor 220 receives power, the motor 220 rotates. The direction of the motor's 220 rotation depends on polarity. The BDC 158 may control the motor's 220 direction of rotation. The axis of the motor 220 may be coupled to the worm 222 by the means of a set screw (not shown). The worm 222 may include a central worm section machined to match the worm gear 224 and two smaller diameter sections at opposite ends of the worm 222 to engage the sleeve bearings 226. The sleeve bearings 226 may prevent the worm 222 from moving axially and radially, and they may be less expensive and simpler than the radial and thrust bearings. They support the worm 222, which may properly decouple the axis of the motor 220 from the forces subjected to the worm 222 when the motor 220 is operating.

Figure 4A:
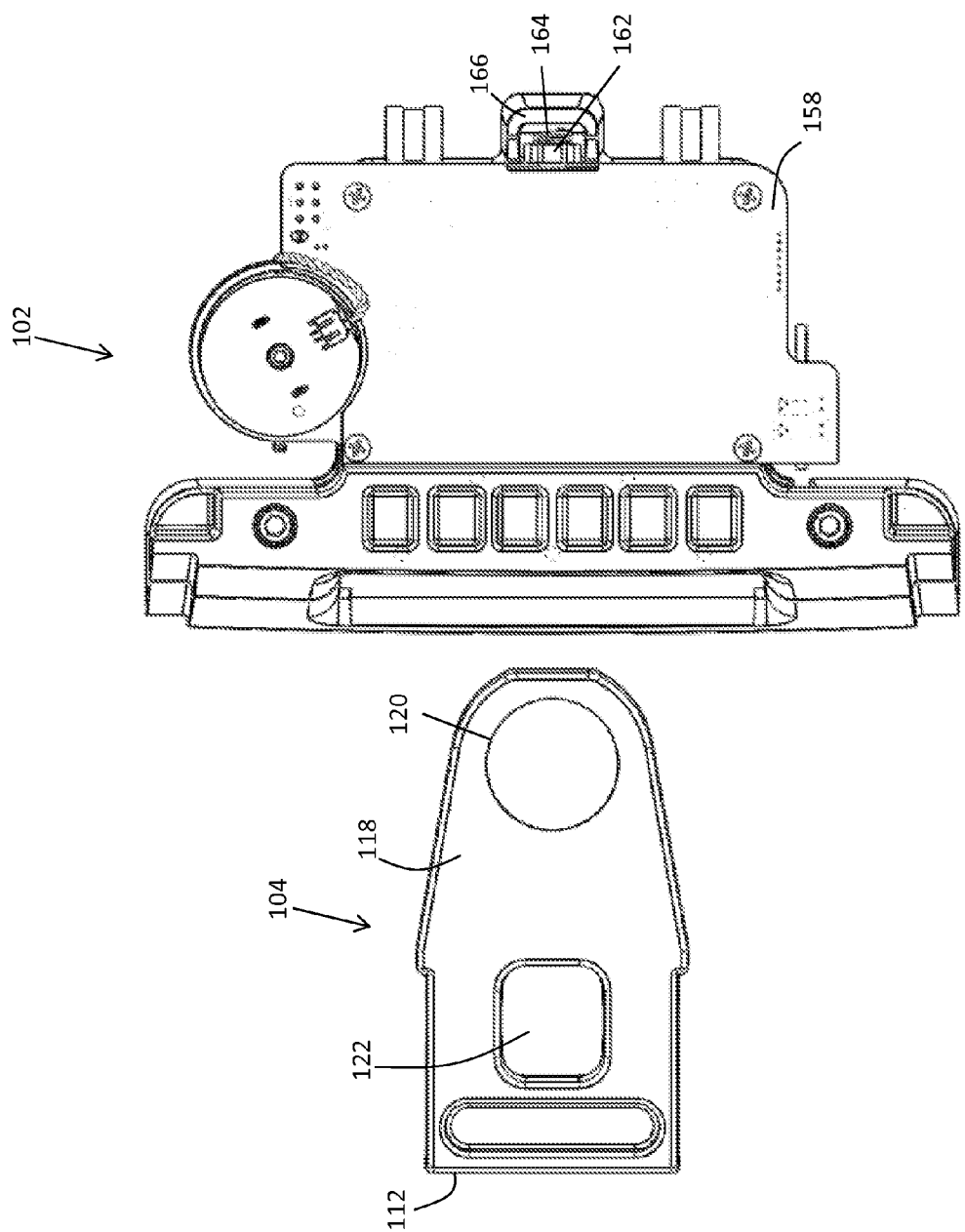
FIG. 4A is a top plan view of the locking receptacle of FIG. 2.
Figure 11:
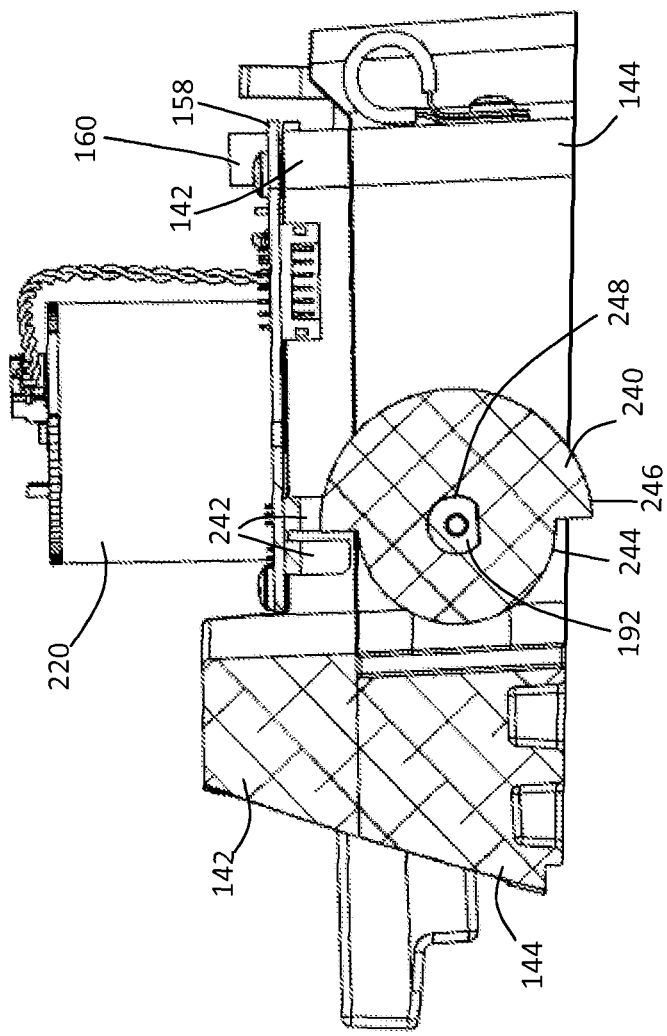
FIG. 11 is a cross-sectional view taken along line DD of FIG. 7.
Figure 12A:
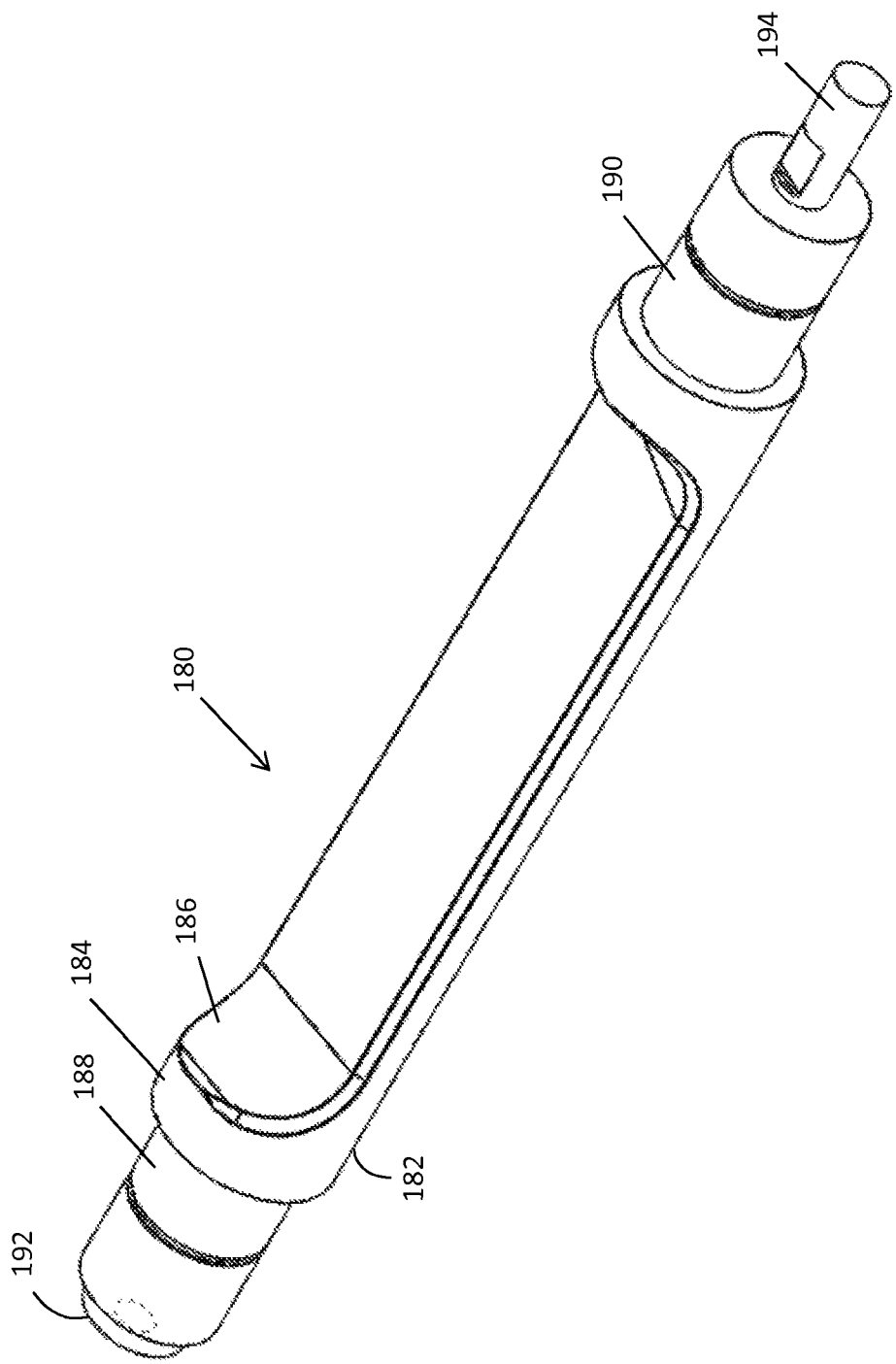
FIG. 12A is a perspective view of a locking shaft according to some embodiments.
Figure 12B:
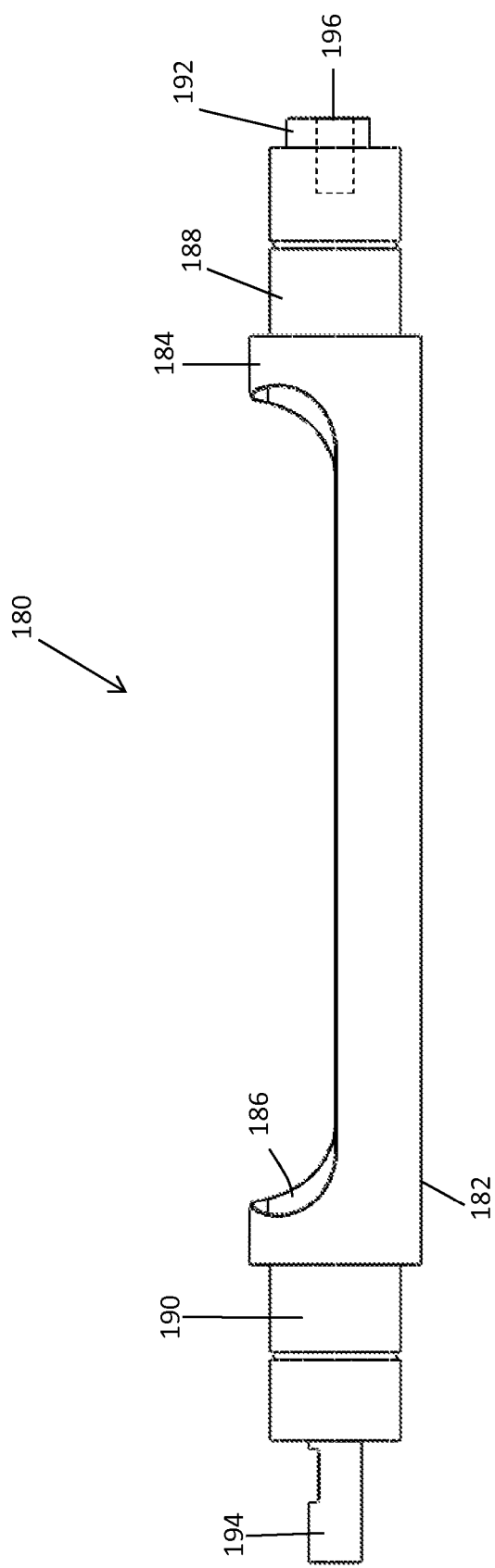
FIG. 12B is a front elevation view of the locking shaft of FIG. 12A.
Figure 12C:
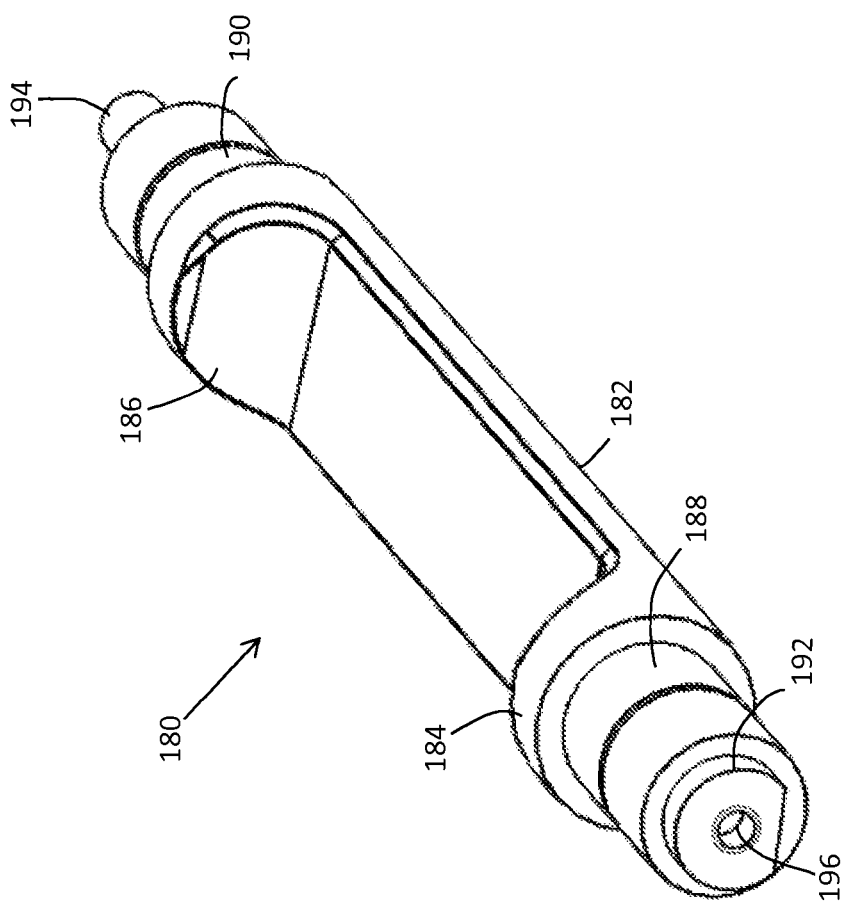
FIG. 12C is another perspective view of the locking shaft of FIG. 12A.

As shown in FIGS. 4B, 9, and 11, the locking receptacle 102 may include a sensing wheel 240 and optical wheel sensors 242 to detect the locked and unlocked positions of the locking shaft 180. The locking shaft 180 may include a sensing wheel connector 192 attached at the supporting end that mates with a locking shaft connector 248 of the sensing wheel 240. In some embodiments, the sensing wheel connector 192 is a D-shaped, male-connector, but may also be any shape, male or female, that is able to connect with the locking shaft connector 248. The sensing wheel connector 192 helps align the sensing wheel 240 with respect to the cutout 186 in the locking shaft 180. Similarly, the locking shaft connector 248, in some embodiments, is a D-shaped, female connector, but may also be any shape to accommodate the sensing wheel connector 192. The D-shape is advantageous because it is simpler to manufacture than a square-shape while working equally well and preventing assembly in the wrong orientation. The sensing wheel connector 192 may include a tapped hole 196 that may be used to secure the locking shaft 180 to the sensing wheel 240, with for example a screw or other elongated or threaded object. Alternatively, press-fitting, welding, or riveting may be used to secure the locking shaft 180 to the sensing wheel 240.

The optical wheel sensors 242 may be mounted on the BDC 158 and arranged around a portion of the sensing wheel 240. Rotating inside the optical wheel sensors 242 is the sensing wheel 240 which may have different wheel diameters, a smaller wheel diameter 244 and a larger wheel diameter 246. The wheel diameters 244, 246 are designed such that each valid position, either the locked position or the unlocked position, is reached when the smaller wheel diameter 244 aligns with one of the optical wheel sensors 242 and the larger wheel diameter 246 aligns with the other of the optical wheel sensors 242.

The sensing wheel 240 may rotate inside the optical wheel sensors 242, as shown in FIGS. 4B and 11. Since the sensing wheel 240 is connected to the locking shaft 180, the sensing wheel 240 rotates with the locking shaft 180. When the locking shaft 180 is in the locked position, the smaller wheel diameter 244 will align with a first of the optical wheel sensors 242 and the larger wheel diameter 246 will align with a second of the optical wheel sensors 242. When the locking shaft 180 is in the unlocked position (i.e., when the locking shaft 180 is rotated 180 degrees), the smaller wheel diameter 244 will align with the second of the optical wheel sensors 242, and the larger wheel diameter 246 will align with the first of the optical wheel sensors 242. The optical wheel sensors 242 can determine the position of the locking shaft 180 (locked or unlocked) based on which wheel diameter is aligned with which of the optical wheel sensors 242. Aligning the same wheel diameter with all of the optical wheel sensors 242 may be invalid.

Alternatively, one or more quadrature or rotary encoders may determine the position of the locking shaft 180 by converting the angular position or motion of the locking shaft 180 to an analog or digital code. One or more potentiometers, reflective infrared (IR) sensors, mechanical switches, optical flag switches, or any other suitable devices may also determine the position of the locking shaft 180.

Electronics Platform

The BDC 158 may include a microcontroller, a controller area network (CAN) controller, an RFID reader chip, and RFID antenna patterns. The CAN controller may be separate from the microcontroller or built into the microcontroller. Alternatively to the CAN controller, the BDC 158 may include an RS485 bus, with or without additional signals running in parallel to the bus. The BDC 158 may use any suitable communication system or protocol other than CAN or RS485, which may or may not require a controller.

The BDC 158 may be on the same plane as the RFID antenna and a cycle key reader, which may be used to read a cycle key (a key that may be used by a user to rent a cycle). The cycle key may be on a different plane than the BDC 158. The RFID tag 204 may also be on a different plane than the BDC 158. The cycle key reader may include an antenna board. In some embodiments, the cycle key reader antenna board may be built-in to the BDC 158. Alternatively, any of the BDC 158, the RFID antenna, the cycle key reader, and the cycle key reader antenna board may be on different planes from each other and may be connected by a single connector or multiple connectors. For example, the BDC 158 may have a connector for connecting the cycle key reader and its antenna board placed at a higher plane in the docking station 100. This is advantageous because the cycle key reader may also have any number of light emitting diodes (LEDs) and the BDC 158 may monitor the states of any number of buttons located near the cycle key reader.

Communication Network

In some embodiments, any number of docking stations 100 may be connected to a terminal as part of a communication network based on CAN or any other suitable communication system or protocol. Each docking station 100 may include a BDC 158, which may include a microcontroller, a CAN controller, an RFID reader chip, and RFID antenna patterns as discussed above. As previously discussed, the RFID antenna may read the RFID tag 204 of a locking member 104 to identify the attached cycle 106 or other moveable object. Each docking station 100 may communicate with the terminal through the CAN or some other communication system. The terminal may be able to perform station inventory to check for errors and determine whether each docking station 100 is occupied or available.

The terminal may have its own communication system or protocol, such as CAN, which may be managed through a terminal microcontroller. The terminal microcontroller may be able to store messages received from any docking station 100 through the CAN or other communication system and forward the messages to the terminal's central processing unit (CPU). The CPU may be an ARM CPU or any other kind of suitable CPU. When required, the terminal microcontroller may wake up the CPU from low power sleep mode and wait for the CPU to be ready. The CPU may run software that drives the terminal display screen, processes transactions, communicates with a server through another communication system such as Global System for Mobile Communications (GSM), and manages the connected docking stations 100 (e.g., reports which cycle is docked where and reports errors).

According to some embodiments, the terminal and/or docking stations 100 may be battery-powered. It is especially advantageous then to place the microcontrollers and CPUs of the terminal and docking stations 100 into a low power sleep mode as soon as possible in order to save power. On the other hand, when something happens on a docking station 100, such as a cycle 106 being returned, the terminal needs to answer a power request from the docking station 100 as soon as possible so that the system feels as responsive as possible to the users. The time required to wake up the terminal microcontroller is less than the time required to wake up the CPU. Thus it is advantageous to have the terminal microcontroller handle real-time communications occurring via the CAN. Less urgent messages such as "Cycle ID 12345 successfully locked on Docking Station 1" are held in the terminal microcontroller's memory to be sent to the CPU once the CPU is ready to receive them. These messages are then processed by the terminal software which, following validation, will execute any subsequent operations that may be necessary. Alternatively, the CPU may have a CAN controller and may directly handle real-time communications occurring via the CAN.

One Embodiment: Returning a Cycle

The following is an embodiment of the process for a user to return a cycle.

1. The user pushes the cycle 106 into the docking station 100.

2. Step 1 may trigger the cycle present switch 160, which may wake up the BDC 158 from its low power sleep mode.

3. The BDC 158 may send a power request to the terminal for the anticipated need to lock a cycle 106.

4. The BDC 158 may read the RFID tag 204 using the RFID antenna. If the reading operation fails, the BDC 158 may retry a number of times before aborting, whereupon the BDC 158 may send a power done notification to the terminal and return to low power sleep mode. Following this, the BDC 158 may make no further attempts to read the RFID tag 204 until the cycle present switch 160 is de-triggered and then re-triggered.

5. If the reading operation succeeds, the BDC 158 may wait for the terminal to grant the power request (the BDC 158 may process and transmit the power request during the RFID reads, reducing delays). If the power request times out, the BDC 158 may produce an error feedback to the user before returning to low power sleep mode.

6. If the BDC 158 timely receives the power granted message from the terminal, the BDC 158 may place the locking shaft 180 into the locked position, locking the cycle 106. If the locking operation fails (e.g., jamming occurs), the BDC 158 may return the locking shaft 180 to the unlocked position and produce an error feedback (e.g., via an error sound and/or a red LED) to the user. The BDC 158 may also send a power done request and an error notification to the terminal before the BDC 158 returns to low power sleep mode. Following this, the BDC 158 may make no further attempts until the cycle present switch 160 is de-triggered and then re-triggered.

7. If the locking operation succeeds, the BDC 158 may send a power done notification to the terminal. The BDC 158 may also send a message indicating that a cycle 106 has been locked. This message may contain at least the cycle identification number read from the cycle's 106 RFID tag 204.

8. The BDC 158 may return to low power sleep mode.

One Embodiment: Renting a Cycle

The following is an embodiment of the process for a user to rent a cycle.

1. The user may interface a cycle key with a cycle key reader on the docking station 100.

2. A switch at the bottom of the cycle key reader may wake up the BDC 158 from low power sleep mode when the insertion of a cycle key triggers the switch.

3. The BDC 158 may read the cycle key via the cycle key reader. If the reading operation fails, the BDC 158 may produce an error feedback (e.g., via an error sound and/or a red LED) to the user and return to low power sleep mode.

4. If the reading operation succeeds, the BDC 158 may send an unlock request to the terminal with at least the information from the user's cycle key. The BDC 158 may produce a "please wait" feedback to the user while it waits for the terminal to authorize the request. The BDC 158 may implement a timeout mechanism. If the BDC 158 has not received an unlock granted message from the terminal by the end of a determined timeout period, the BDC 158 may produce an error feedback to the user.

5. If the BDC 158 receives the unlock granted message from the terminal by the end of the determined timeout period, the BDC 158 may send a power request to the terminal.

6. The BDC 158 may wait for the terminal to grant the power request. If the power request times out, the BDC 158 may produce an error feedback to the user before returning to low power sleep mode.

7. If the BDC 158 timely receives the power granted message from the terminal, the BDC 158 may unlock the cycle 106. If the unlocking operation fails, the BDC 158 may attempt to relock the cycle 106, send a notification about this error to the terminal, produce an error feedback to the user, send a power done message to the terminal, and return to low power sleep mode.

8. Upon successful unlocking, the BDC 158 may produce a success feedback (e.g., "OK" sound and/or a green LED) to the user and send a power done message to the terminal.

9. The BDC 158 may wait for the cycle present switch 160 to become disabled, confirming that the docking station 100 is free of the cycle 106, which is probably in the possession of the user. When the cycle present switch 160 becomes disabled, the BDC 158 may send a notification to the terminal.

10. The BDC 158 may return to low power sleep mode.

In some embodiments, the BDC 158 may omit requesting power from the terminal if the total maximum current for one docking station 100 does not exceed the power carrying capacity of the cables or the power supply capability of the system. It may be advantageous to retain this, however, because it may prevent a large number of users simultaneously returning cycles 106 from causing an overcurrent that blows the system's fuse or fuses. In this regard, a large number may be any number in excess of what the system can support without implementing power requests. This large number may be a function of the total maximum current for one docking station 100, the current carrying capacity of the cables, and the main fuse value. The total maximum current for a docking station 100 may depend on the size of the motor 220, the motor 220 being selected to obtain a good compromise of raw torque and speed. The current carrying capacity of the cables depends on the gauge. As the gauge is lowered, the current capacity increases, but the price also increases. Lower gauge also increases bending difficulty, which does not ease installation. The power request feature may lead to cost savings due to less conductive material and easier installation while maintaining reliability.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A bicycle locking mechanism for locking a locking member secured to a bicycle, the locking mechanism comprising:
    a locking receptacle having a recess configured to receive the locking member; and
    an asymmetrical locking shaft positioned adjacent the recess of the locking receptacle, the locking shaft having a locked position and an unlocked position,
    at least one bearing,
    wherein the locking shaft is configured to secure the locking member when the locking shaft is in the locked position while the recess of the locking receptacle is receiving the locking member,
    the locking shaft comprises a lock side and an unlock side, and
    the locking shaft is rotatably mounted adjacent the recess by the at least one bearing such that the locking shaft is rotatable between the locked position and the unlocked position by rotating the lock side of the locking shaft into and out of engagement with the locking member.

2. The locking mechanism of claim 1, wherein the locking shaft is configured to allow the locking member to be releasable from the locking receptacle when the locking shaft is in the unlocked position while the recess of the locking receptacle is receiving the locking member.

3. The locking mechanism of claim 1, further comprising a bicycle present switch configured to detect when the recess of the locking receptacle is receiving the locking member.

4. The locking mechanism of claim 1, wherein the locking shaft comprises a cylindrical shaft configured to axially rotate the locking side of the locking shaft into and out of the recess to switch between the locked position and the unlocked position.

5. The locking mechanism of claim 1, further comprising an irreversible drive driven by a motor to rotate the locking shaft.

6. The locking mechanism of claim 1, wherein the unlock side includes a cutout.

7. The locking mechanism of claim 1, wherein the locking member comprises a channel configured to be engaged by the lock side of the locking shaft, wherein the channel has a larger internal volume than the lock side.

8. The locking mechanism of claim 1, further comprising a sensing member configured to rotate with the locking shaft to determine when the locking shaft is in the locked position or the unlocked position.

9. The locking mechanism of claim 8, further comprising at least one sensor configured to detect when the locking shaft is in the locked position or the unlocked position based on the rotation of the sensing member.

10. The locking mechanism of claim 1, wherein the locking member comprises an RFID tag.

11. A method for locking a bicycle, the method comprising:
    receiving a locking member in a locking receptacle, the locking member being attached to the bicycle; and
    securing the locking member to the locking receptacle by:
        while the locking receptacle is receiving the locking member, rotating, using a motor, an asymmetrical locking shaft disposed in the locking receptacle to switch from an unlocked position to a locked position such that a portion of the locking shaft is blocking a portion of the locking receptacle.

12. The method of claim 11, further comprising unsecuring the locking member from the locking receptacle when the locking shaft is in the unlocked position while the locking receptacle is receiving the locking member.

13. The method of claim 11, wherein the locking shaft comprises a cylindrical shaft that is configured to axially rotate to switch between the locked position and the unlocked position.

14. The method of claim 11, wherein rotating the locking shaft comprises the motor driving an irreversible drive.

15. The method of claim 11, wherein the locking shaft comprises a lock side and an unlock side, wherein the unlock side includes a cutout.

16. The method of claim 15, wherein the locking member comprises a channel configured to be engaged by the lock side of the locking shaft, wherein the channel has a larger internal volume than the lock side.

17. The method of claim 11, further comprising determining when the locking shaft is in the locked position or the unlocked position based on a sensing member configured to rotate with the locking shaft.

18. The method of claim 17, wherein determining when the locking shaft is in the locked position or the unlocked position comprises detecting rotation of the sensing member using at least one sensor.

19. The method of claim 11, further comprising reading an RFID tag of the locking member to identify the bicycle.

20. A bicycle management system comprising:
    a plurality of docking stations; and a terminal connected to the plurality of docking stations by a network, wherein at least one of the plurality of docking stations includes:

a key reader configured to read a key; and a locking mechanism for locking a locking member secured to a bicycle, the locking mechanism including:

a locking receptacle configured to receive the locking member;

at least one bearing; and an asymmetrical locking shaft rotatably mounted by the at least one bearing such that the locking shaft is rotatable between a locked position, in which a lock side of the locking shaft extends into a recess of the locking receptacle and is positioned to engage and secure the locking member while the locking receptacle is receiving the locking member, and an unlocked position in which the lock side of the locking shaft is rotated out of the recess of the locking receptacle such that the locking shaft is out of the path of the locking member into or out of the locking receptacle.

* * * * *